INVENTORS
SHIGEO KUWAYAMA
MOTOHIKO YAGI

BY

ATTORNEYS

United States Patent Office 3,523,363
Patented Aug. 11, 1970

3,523,363
METHOD OF MAKING A HEATING ELEMENT
Shigeo Kuwayama and Motohiko Yagi, Odawara-shi, Kanagawa, Japan, assignors to Fuji Photo Film Co., Ltd., Kanagawa, Japan
Filed Apr. 18, 1969, Ser. No. 817,519
Claims priority, application Japan, Apr. 20, 1968, 43/26,458
Int. Cl. H05b 3/00, 3/44
U.S. Cl. 29—611
2 Claims

ABSTRACT OF THE DISCLOSURE

The present invention relates to a method of making a heating element, said method comprising burying a metallic resistance heating element and a burning material in a ceramic or heat-resistant cement layer provided on a base surface, said burning material being buried in the vicinity of said metallic resistance heating element, and heating the whole at a temperature lower than that at which the base is not greatly distorted and higher than that at which said burning material is burned.

BACKGROUND OF THE INVENTION

Field of the invention

The present invention relates to a method of making a heating element, and in particular to a method of making a heating element consisting of a metallic resistance heating element of strip or string shape.

Description of the prior art

Heretofore, the flat-shaped electric heating element which has been used for the heating portion of an electric iron comprises a metallic resistance heating element of strip or string shape between mica plates. The mica plates holding the heating element are pressed against a metallic plate or crystallized glass plate, whereby the heat generated from the heating element is conducted through the metallic plate or the crystallized glass plate. But in such an electric heating element, the contact of the mica, including the metallic resistance heating element, with the metallic plate or the crystallized glass plate is deteriorated partially, resulting in unevenness in the temperature of the metallic plate or the crystallized glass plate. This result is due to the fact that the part of the mica which the metallic plate or the crystallized glass plate is not in good contact therewith is over heated, since the heat at this point is not emitted sufficiently. Sometimes the metallic resistance heating element is cut down for the overheat. The maximum usable temperature of the mica plate is around 400° C., and the above-described heating element is not adequate for use at higher temperatures.

In the case where the metallic resistance heating element is adhered directly to the crystallized glass plate with a heat-resistive adhesive, the heating element is easily broken by the difference in thermal expansion coefficient between the metallic resistance heating element having a large expansion coefficient and the heat-resistive adhesive or the crystallized glass plate having a small expansion coefficient. In order to absorb the difference in thermal expansion coefficient between the metallic resistance heating element and the heat-resistive adhesive or the crystallized glass plate, the heating element can be made by adhering a plurality of tubular crystallized glass, glass, ceramics or the like to a heat emitting plate of crystallized glass, glass, quartz glass, ceramics or the like, in parallel relation therewith, with a heat-resistive adhesive, and by inserting into the tubular member a metallic resistance heating element. But in such types of heating elements, the temperature distribution on the surface of the plate is inclined to be uneven, since the heat generated at the metallic resistance heating element is transmitted to the plate shaped crystallized glass, glass, quartz glass or ceramics by radiation. In order to realize a temperature on the surface of the plate greater than 500° C., the internal temperature in the vicinity of the metallic resistance heating element should be much higher than 500° C. because of the inefficient heat transmission.

SUMMARY OF THE INVENTION

The present invention provides a method of making a heating element wherein the above-mentioned disadvantages are completely eliminated. According to the present invention, after a metallic resistance heating element and a burning material are buried in the same vicinity in the heat-resistant cement layer or the ceramic layer provided on the base surface, the layer is heated to burn the burning material, whereby a small hollow results in the vicinity of the metallic resistor.

In accordance with the present invention, small hollows can be easily formed in the vicinity of the metallic resistance heating element of the electric heating element. By creating the above-mentioned small hollow in the electric heating element, the element is prevented from being broken on account of the difference in thermal expansion coefficient between the ceramic or heat resistant cement layer and the metallic resistance heating element, when the heating element is in use. And since the metallic resistance heating element is buried in the ceramic or heat-resistant layer adjacent to the small hollow, thermal conductivity is so high that the base can be heated uniformly even if the metallic heating elements are arranged on the base relatively coarsely. Moreover, in the electric heating element in accordance with the present invention, the metallic heating element is not incandesced even with a base surface temperature of 500° C. or higher because of the high thermal conductivity, so that the metallic heating element has a long life.

Other objects, advantages, and applications of the present invention will become apparent when considered with the following detailed description.

DETAILED DESCRIPTION OF THE INVENTION

Figure 1:
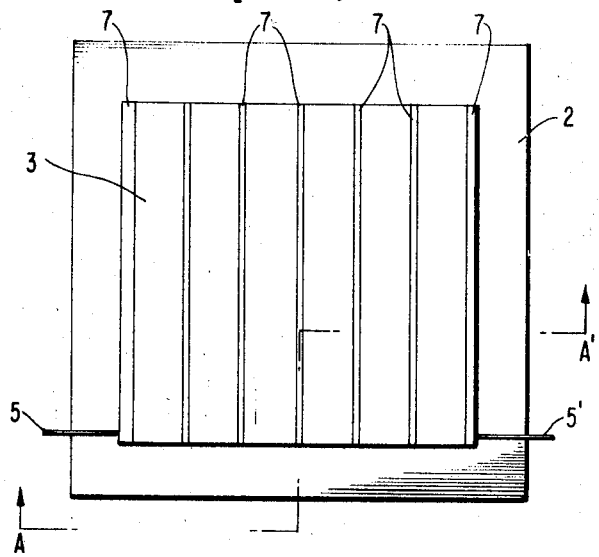
FIG. 1 is a plan view of the plane electric heating element in accordance with the invention.
Figure 2:
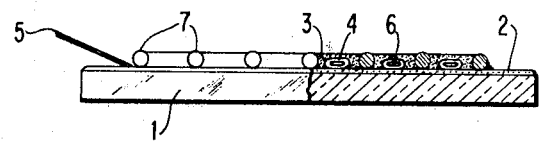
FIG. 2 is a front view partly in section taken along the line A–A' in FIG. 1.

Referring to FIGS. 1 and 2, reference numeral 1 denotes a plane base made of glass, quartz glass ceramic or crystallized glass, 2 and 3, each denote a heat-resisting adhesive layer such as ceramic or heat-resistant cement, 4 denotes a strip-shaped metallic heating element coiled into a strip coil, 5 and 5' denote external extension terminals for the metallic heating element 4, 6 denotes burning material such as paper or plastic, and 7 denotes a spacer.

The heating element of the present invention is formed by forming a heat-resisting adhesive layer 2 on the plane base 1, burning thereon the burning material 6 around which the strip-like metallic heating element 4 is coiled with the heat resistant adhesive layer 3 in zigzag shape, burying spacers 7 made of glass, quartz glass, ceramic or crystallized glass between the zigzag rows of the metallic heating element 4, and then heating the whole element at a high temperature. The burning material 6 is burned by heating, resulting in a hollow in the coiled strip metallic heating element 4. Therefore, the stress exerted on the heat-resisting adhesive layers 2 and 3 by the difference of thermal expansion coefficients between the heat-resistant adhesive layers and the strip like metallic heating element 4 is absorbed by the hollow and the heat-resisting adhesive layer 2 or 3 is thereby prevented from being broken by the stress. The spacer 7 is provided for reinforcing the weak heat-resistant adhesive layer 3, and may be omitted if desired. As the electric heating element is constructed as described above, the heat on the metallic heating element 4 is uniformly transmitted onto the plane base.

Figure 3:
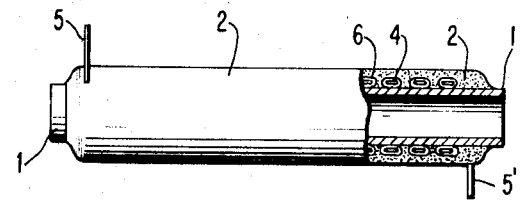
FIG. 3 is a side view partly in section of the tubular electric heating element in accordance with the present invention.

Now referring to FIG. 3 which illustrates an embodiment of the tubular electric heating element in accordance with the invention the reference character 1 denotes a tubular base made of glass, quartz glass, ceramic or crystallized glass. 2 denotes a heat-resisting adhesive layer, 4 denotes a strip-like metallic heating element coiled into a spiral shape around the external face of the base 1, 5 and 5' denote external extension terminals for the metallic heating element 4, and 6 denotes a burning material.

This second embodiment of the electric heating element in accordance with the present invention is made by winding the strip-like metallic heating element 4, surrounded with the burning material layer 6, around the external face of the tubular base 1, providing thereon a heat-resisting adhesive layer 2, burning the burning material 6 at the temperature lower than that at which the base 1 is greatly distorted and higher than that at which the burning material 6 is burned, thus making hollows around the strip-like metallic heating element 4, and sintering the heat-resisting adhesive layer 2.

EXAMPLE 1

A more detailed description of the present invention is set forth in the following examples, which are intended to be non-limiting in nature.

Figure 4:
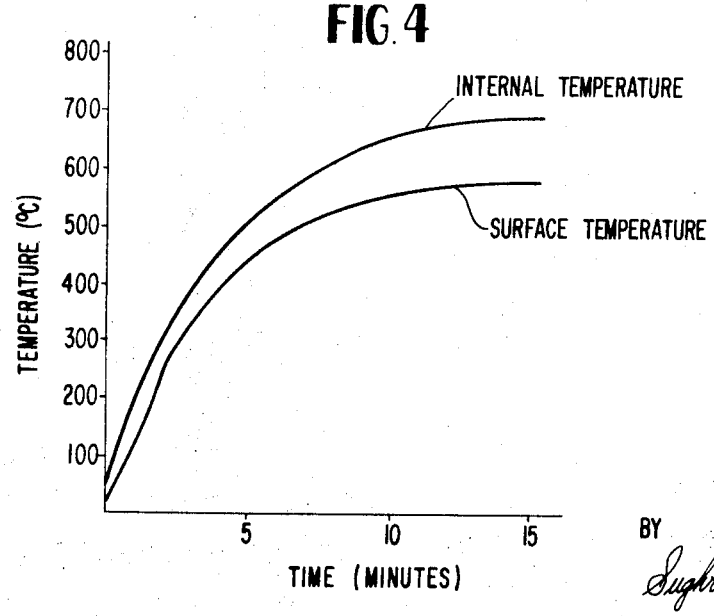
FIG. 4 is a diagram of the temperature curve showing the characteristics of the plane electric heating element in accordance with the present invention.

Onto a surface of a 150 mm. x 100 mm. plane plate having a thickness of 6 mm. and comprising a crystallized glass manufactured in accordance with the specification of Japanese patent publication No. 7,914/64, a heat-resisting adhesive is coated and dried to a thickness of about 1 mm. The heat-resisting adhesive is made by combining 85 parts by weight of crystallized glass powder, 15 parts by weight of kibushi clay, a little water glass and about 24 parts by weight of water. Separately, an iron chrome electric heating strip of 2.8 m. length made of FCH2 (name of the material), having a width of 1.4 mm. and a thickness of 0.17 mm. is wound on a kraft paper of 7 mm. width and 100 mm. length in a spiral shape. The strip-shaped electric heating element is arranged on the heat-resisting adhesive layer (made as described above) in a zigzag shape as shown in FIG. 1, and solid bars are arranged as spacers. The spacers are made of crystallized glass of 3 mm. diameter. The above-described heat-resisting adhesive is provided between the spacers and after the electric heating element is covered the element was dried. The electric heating element thus made was burned for two hours at 1050° C., and the square plane plate and spacer, both made of crystallized glass, were crystallized into white, then the heat-resisting adhesive was sintered and the kraft paper was burned. The plane electric heating element thus made in accordance with the present invention was located in the horizontal position and the lower layer of the heat-resisting adhesive layer, including the electric heating strip, was covered with ceramic fibers of 15 mm. thickness, as the heat insulating layer. The change in surface temperature of the plane plate with respect to the time during which the opposite ends of the electric heating element are impressed with an alternating current of 100 volts and the change in internal temperature between the ceramic fibers and the electric heating element are shown in FIG. 4. About 4 minutes after the electric current was applied, the surface temperature was raised up to 400° C. The required electric power was 600 watts, the surface charge density on the surface of the square plane plates was 10 watt/cm.$^2$, and the electric heating strip surface charge density was 6.8 watt/cm.$^2$. This experiment was performed several times without any significant change in results.

EXAMPLE 2

A cylindrical tube of 30 mm. diameter, 2 mm. wall thickness, 150 mm. length, and made of crystallized glass as in Example 1 was used as the base. 60 parts by weight of ethylcellulose and 15 parts by weight of dibutyl phthalate were dissolved into 325 parts by weight of a toluene-ethanol mixture in 4:1 proportion. Into this dope, 40 parts by weight of cellulose powder was mixed and stirred. After the electric heating element of the same dimension as in the Example 1 was dipped in the mixture, it was dried to cover the surface thereof. Then the covered electric heating element was wound around the cylindrical tube in a spiral shape and the heat-resisting adhesive of Example 1 was provided thereon and dried, then burned under the same conditions as in Example 1. A 100 volt alternating current was applied to the electric heating element with no adverse effects.

Though several embodiments of the electric heating element of the present invention have been disclosed, the invention is not limited to the above-described embodiments or examples. Modifications and variations can be made in the spirit and scope of the invention. Moreover, it is effective to provide a metallic mask on one surface of the electric heating element in a plate shape when the heating element is attached to a heater which uses only one surface thereof, since the heat radiation at one surface is reduced and heating efficiency is increased.

What is claimed is:
1. A method of producing an electric heating element comprising burying a metallic resistance heating element and a burning material in a heat-resistant cement layer provided on a base surface, said burning material being buried in the vicinity of said metallic resistance heating element, and heating the resulting assembly at a temperature lower than that at which said base is not greatly distorted and higher than that at which said burning material is burned thereby forming a hollow near said heating element to allow for expansion due to the difference in thermal expansion coefficient between said cement and said heating element when said element is heated.

2. The method of producing an electric heating element comprising incorporating a metallic resistance heating element and a material selected from the group consisting of paper and plastic in a heat-resistant cement layer on a glass surface, said material being adjacent to said metallic resistance heating element, and heating the assembly to a temperature lower than the distortion temperature of said glass base and higher than that at which said material is substantially eliminated from said element, thereby forming a vacant space near said heating element to permit restricted expansion due to the difference in thermal expansion coefficient between said cement and said heating element when said element is heated.

References Cited

UNITED STATES PATENTS 2,131,887 10/1938 Friederich et al. ____ 29—610 X
2,870,277 1/1959 Carter _____ 29—611
3,083,445 4/1963 Hill _____ 29—610

WILLIAM I. BROOKS, Primary Examiner

U.S. Cl. X.R.

219—544; 338—306